United States Patent [19]

Maeda

[11] Patent Number: 4,562,104
[45] Date of Patent: * Dec. 31, 1985

[54] ADHESIVE BONDING OF SCATTER COATED METAL OBJECTS

[75] Inventor: Takao Maeda, Kariya, Japan

[73] Assignee: Toyota Jidosha Kabushiki Kaisha, Toyota, Japan

[*] Notice: The portion of the term of this patent subsequent to Dec. 31, 2000 has been disclaimed.

[21] Appl. No.: 917,286

[22] Filed: Jun. 20, 1978

[30] Foreign Application Priority Data

Jul. 6, 1977 [JP] Japan .................................. 52-80586

[51] Int. Cl.⁴ ............................................. B32B 5/16
[52] U.S. Cl. ...................................... 428/148; 29/459;
29/DIG. 2; 156/73.5; 156/153; 156/281;
156/330; 427/11; 427/192; 428/57; 428/416
[58] Field of Search .................. 156/51, 52, 73.5, 629,
156/630, 631, 330, 153, 281; 427/192, 203, 207
D, 405, 409, 11; 428/548, 551, 553, 562, 615,
624, 626, 653, 416, 57, 148, 328; 29/458, 459,
527.4, DIG. 1, DIG. 2; 152/359

[56] References Cited

U.S. PATENT DOCUMENTS

| | | | |
|---|---|---|---|
| 2,640,002 | 5/1953 | Clayton | 427/11 X |
| 2,920,990 | 1/1960 | Been et al. | 428/416 X |
| 3,700,505 | 10/1972 | Kanter | 427/11 X |
| 3,813,266 | 5/1974 | Porta et al. | 427/203 X |
| 3,852,151 | 12/1974 | Knapp | 428/148 |
| 3,899,377 | 8/1975 | Luc | 156/73.5 |

FOREIGN PATENT DOCUMENTS 2541235  3/1977  Fed. Rep. of Germany ........ 427/11

OTHER PUBLICATIONS

P. T. Stroup et al., "Aluminum Coating of Steel—A Comparison of Various Processes", Metal Progress, Jan. 1950, pp. 59–63, 128, 130.

Primary Examiner—Robert A. Dawson
Attorney, Agent, or Firm—Quaintance, Murphy & Presta

[57] ABSTRACT

A method of bonding a metallic object to another object includes scatter coating an aluminum containing metal on the surface of the metallic object, after cleaning the surface, and bonding the metallic object to the other object with an adhesive. Where both objects are metallic, the surfaces to be bonded are each scatter coated with aluminum. The scatter coating can be formed by friction coating aluminum containing metal onto each metal surface to be bonded.

6 Claims, 6 Drawing Figures

ADHESIVE BONDING OF SCATTER COATED METAL OBJECTS

BACKGROUND OF THE INVENTION

This invention relates to an improved method for bonding objects together.

Metallic objects to be bonded together with a synthetic resin structural adhesive such as an epoxy resin adhesive, for example, objects containing iron or steel, conventionally have their surfaces to be bonded pre-treated in order to improve bonding strength and prevent corrosion of their surfaces at the adhesive bond.

Such methods of pre-treatment can include either a physical method or a chemical method, or both. Physical methods include heating the surfaces to remove fats and oils, and polishing the surfaces by using a sander or grinder. Chemical methods include the removal of fats and oils with a swab or gauze impregnated for example with an organic solvent such as acetone or trichloroethylene.

However, these conventional methods are insufficient to activate the bonding interface of the objects and consequently, it is quite difficult to bond the objects together to obtain a satisfactory bond strength, without a gap between the surfaces and the adhesive. Furthermore, when the objects thus bonded are subjected to severely corrosive conditions, e.g. 50° C. and 100% humidity for one month, hydroxides or oxides are formed on the bonding interface between the objects and the adhesive and the objects are apt to separate at the bonding interface.

SUMMARY OF THE INVENTION

The present invention solves the above-mentioned drawbacks of the conventional methods, by preventing hydroxides or oxides from forming on the bonding interface, so that an unusually strong bond is attained, and remains strong for a substantial period of time.

It is an object of the present invention to obtain excellent bonding strength by relatively simple surface treatment of the metal surface to be bonded.

The present invention provides a bonding method which makes it easy to tenaciously bond together a metal object and another object which can be non-metal, metal of the same type as the object, or a different metal, and provides for tenacious adhesive bonding to a surface of an iron or steel metal object.

DETAILED DESCRIPTION OF PREFERRED EMBODIMENT

Metallic objects to be bonded by using a synthetic resin type adhesive, in accordance with the invention, are first cleaned to remove fats and oils and an oxide film from the surfaces of the objects to be bonded, and then, a layer of aluminum or an aluminum alloy consisting principally of aluminum is scatter coated onto the surfaces to be bonded, and the articles are then bonded together by using the synthetic resin adhesive.

The method of bonding metals in accordance with this invention comprises sufficiently pre-treating the bond portion of metallic sheets, e.g. an iron sheet, by physically or chemically removing impurities, and then forming or otherwise attaching aluminum or an aluminum alloy to the surfaces to be bonded, by a physical or chemical technique, thereby forming a stable and fine active aluminum scattered surface on the metallic sheets.

In order to pre-treat the bonding surface in the method of this invention, a conventional method such as a degreasing or rust-removing technique generally used in the art can be employed. To scatter coat the aluminum or aluminum alloy on the surface to be bonded, techniques such as friction welding, explosive pressing of an aluminum powder or an aluminum foil, or metallizing, can be employed.

Treatment of the surfaces in this manner furnishes the bonding surfaces of the metals with a fine scattered aluminum. When the synthetic resin type adhesive is applied, the active layer is coated without any gap between the adhesive and the layer and tenaciously bonds the surfaces together. Since aluminum has a strong affinity for the adhesive, it is possible to obtain extreme bonding strength. In addition, because aluminum readily forms an aluminum oxide layer which is essentially non-corrosive, the bonding interface containing the aluminum layer is also non-corrosive. Accordingly, even if the bonded objects are left standing under conditions of high humidity for a long period of time, hydroxides or oxides do not form on the bonded interfaces, and the bonded objects therefore have excellent resistance to humidity and corrosion failure.

The following examples illustrate more precisely, the bonding technique of the prior art, as well as that of the present invention.

REFERENCE EXAMPLE 1

Figure 1:
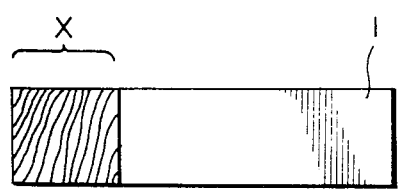
FIG. 1 is a plan view of an iron sheet used as the testpiece in the conventional method.
Figure 2:
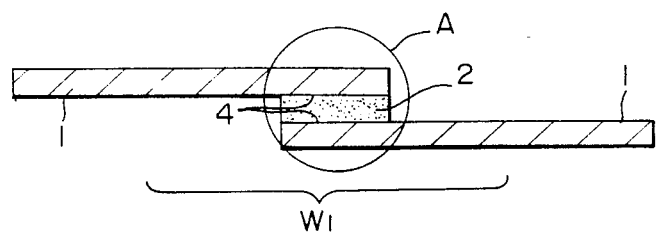
FIG. 2 is a sectional view of the testpiece obtained by the conventional bonding method.
Figure 3:
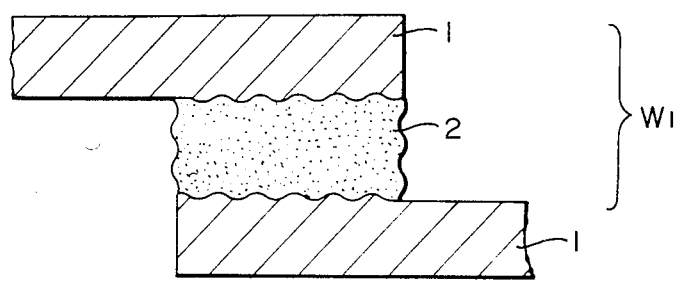
FIG. 3 is an enlarged sectional view of the portion A in FIG. 2.

An iron sheet 1 of a length of 100 mm, a width of 25 mm and a thickness of 1.6 mm as shown in FIG. 1 is used as the reference testpiece. The bond portion X and its periphery of the iron sheet 1 are sufficiently heated by a propane burner to degrease and remove contaminations such as dust and dirt, press oil, finger prints, etc. from the bonding portion. Since a number of oxide films are formed on the bonding surface thus heated, they are subsequently polished off the surface and removed with a $40 disc sander. The surface after polishing has unevenness of about 10–20 microns. Two iron sheets 1 thus subjected to this treatment are bonded together with a solid adhesive 2 of an epoxide resin type, thereby producing a testpiece $W_1$ as shown in FIG. 2. FIG. 3 is an enlarged sectional view of the bond portion A of the resulting testpiece $W_1$.

INVENTION EXAMPLE 1

Figure 4:
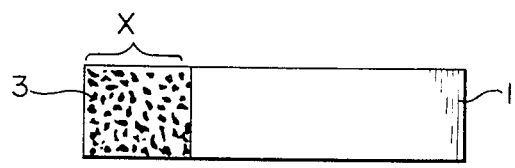
FIG. 4 is a plan view of an iron sheet having aluminum scatter coated thereon that is used as the testpiece in accordance with the method of the present invention.

An iron sheet 1 of the same type as used in Reference Example 1 is sufficiently heated and degreased and the oxide films are removed by polishing in the same way as above. Using a custom-made eccentric aluminum sander having an aluminum base fitted to the rotary section of the sander, the bonding portion X of the resulting iron sheet 1 is subjected to rotary friction whereby metal of the aluminum base is friction-welded onto the surface and active aluminum of 30 microns maximum size is spot-attached to the surface as shown in FIG. 4. There is thus formed a coated layer 3 having an attachment area of 80-90% of the area of the surface.

Figure 5:
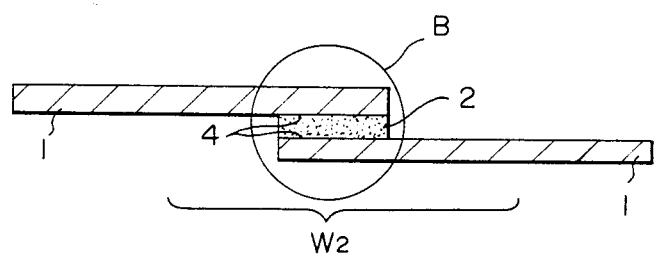
FIG. 5 is a sectional view of the testpiece obtained by the bonding method of the present invention.
Figure 6:
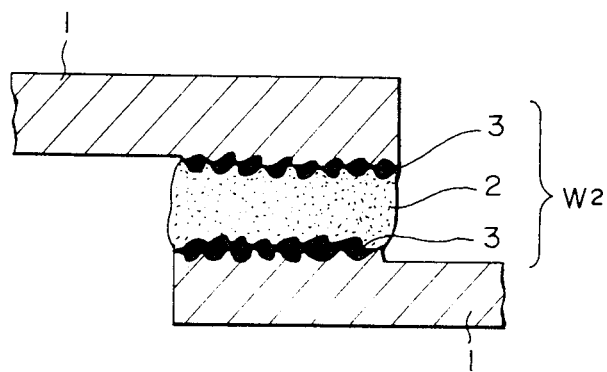
FIG. 6 is an enlarged sectional view of the portion B in FIG. 5.

The epoxide resin is then applied to the treated surfaces and the iron sheets are bonded together in the same way as in Reference Example, thereby providing a testpiece $W_2$ as shown in FIG. 5. FIG. 6 is an enlarged sectional view of the bond portion B shown in FIG. 5.

COMPARATIVE TEST

Thirty sets of each of the testpieces $W_1$ and $W_2$ (totaling 60 sets) were produced respectively as specified in the above-mentioned Reference Example and Invention Example. These sets were placed in a thermo-hygrostat at 50° C. and 100% humidity. After 45 days, bonding strength of each testpiece was determined by means of shear tensile strength and condition of the fracture at the time of separation. The occurrence of hydroxides or oxides on the bonding interface 4 between the iron sheets 1 and the epoxy resin type adhesive 2 was determined by observing the fractured surface after the test. The results of quantitative comparison of the testpieces obtained by the prior art method and the method of the present invention are shown in Table I.

TABLE I

| Example | Number of Test | Bonding Strength *1 | | Condition of occurrence of hydroxides or oxides |
|---|---|---|---|---|
| | | Shear tensile strength | Condition of fracture | |
| Reference Example 1 (Testpiece $W_1$) | 1 | 100 | Poor bonding strength due to fracture of interface | Hydroxides or oxides occur in all testpieces |
| | 2 | 94 | | |
| | 3 | 106 | | |
| Invention Example 1 (Testpiece $W_2$) | 1 | 137 | Strong bonding strength due to aggregated fracture | Hydroxides or oxides do not occur in all testpieces |
| | 2 | 139 | | |
| | 3 | 141 | | |

*1 The shear tensile strength is the average value for 10 testpieces. Three sets of testpieces were tested. The average value of the Reference Example testpiece was 100.

As can be clearly seen from the above-mentioned test results, although the bonding method of Reference Example 1 renders the surface of the iron sheets to be an active surface of about 10-20 microns as a result of polishing by the sander, the bonding strength of the resulting testpiece $W_1$ was not sufficient partly because the disc sander itself is contaminated and partly because it is difficult to perfectly remove the films secured to the grooves of the sander meshes. On the other hand, the bonding method of Invention Example 1 achieves a stable, fine and uneven active surface of about 30 microns by attaching aluminum 3 onto the surface of the iron sheets 1. In addition, since the epoxy type adhesive 2 has strong affinity with aluminum 3 and exhibits a physical anchoring effect, the resulting testpiece $W_2$ has extremely high bonding strength. This bonding strength is improved by about 40% in comparison with that of the testpiece $W_1$ of Reference Example 1, and it does not decrease significantly even when exposed to humidity at high temperature (50° C.) for an extended period (45 days).

Though hydroxides or oxides formed on each testpiece $W_1$ in Reference Example 1, neither hydroxide nor oxide formed on any testpiece $W_2$ which was subjected to the pre-treatment corresponding to Invention Example 1. All the testpieces $W_2$ failed by aggregated fracture of the adhesive.

As described above, the bonding method of the present invention perfectly eliminates the possibility of incurring severe problems such as separation of the bonded surfaces from the adhesive and provides extremely high industrial advantages such as prolongation of the life of the bonded product.

Incidentally, though the above-mentioned examples deal with bonding of iron sheets together, the bonding method of the present invention can be adapted not only to iron sheets but also where one sheet is iron and the other sheet or object is plastic or a different metal, as well as to other metallic sheets in a like manner. In the aspect of preventing corrosion of the bonding portion, however, the effect of the present invention becomes most remarkable in the case of at least one iron type object.

What is claimed is:

1. A method of adhesively bonding a first metallic object to a second metallic object comprising, the steps of: forming a thin scatter coated aluminum containing surface on each metal object by rubbing an aluminum containing metal piece against a surface of each object with an eccentric sander to fuse aluminum onto the surfaces by friction welding, and then adhesively bonding the aluminum containing surfaces of the objects together with an adhesive between said aluminum containing surfaces to strongly bond the objects together.

2. A method of claim 1 wherein at least one of said metallic objects is an iron base metallic object.

3. A method according to claim 1 wherein said first and second objects are iron base objects.

4. The method of claim 1, further comprising removing fats, oils, and oxide films from the surfaces of said metallic objects to be scatter coated before forming said aluminum containing surfaces on the objects.

5. Adhesively bonded metallic objects comprising a first metallic object, a thin scattered aluminum containing surface coating friction welded onto the first object, a second metallic object, a thin scattered aluminum containing surface coating friction welded onto the second object, and an adhesive between said surface coatings and adhesively bonding said surface coatings together to bond said objects together.

6. Adhesively bonded metallic objects according to claim 5 wherein said metallic objects comprise iron base objects having said aluminum containing friction welded scatter coatings or surfaces thereof.

* * * * *